No. 727,283. PATENTED MAY 5, 1903.
P. B. CADY.
FLEXIBLE PHOTOGRAPHIC FILM.
APPLICATION FILED FEB. 10, 1903.
NO MODEL.
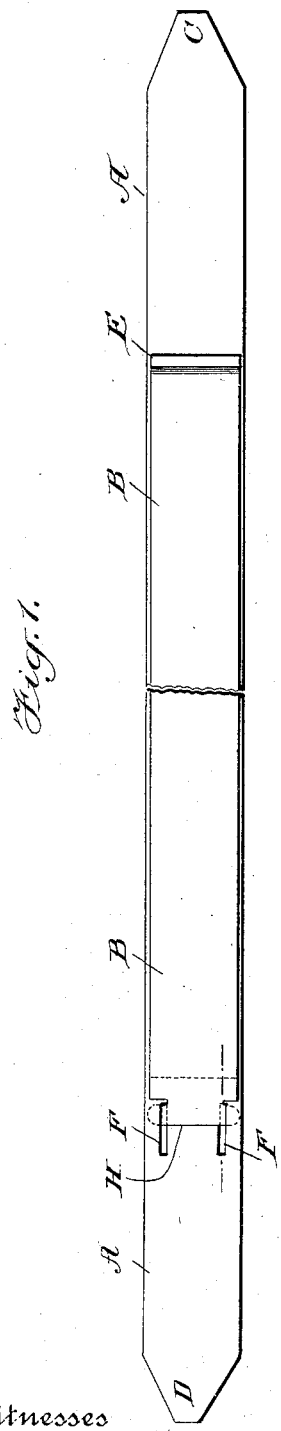
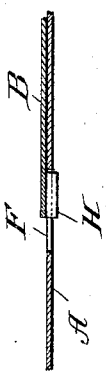
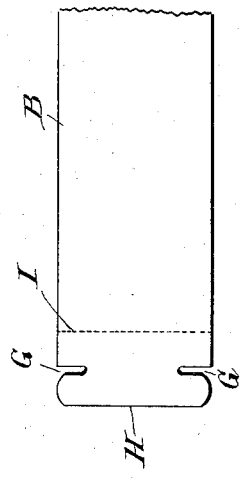
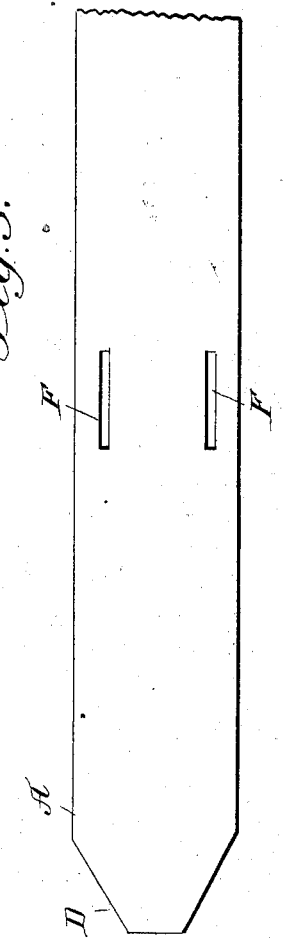
Witnesses
Inventor
Parker B. Cady
By his Attorney
Phillips Abbott No. 727,283. Patented May 5, 1903.

UNITED STATES PATENT OFFICE.

PARKER B. CADY, OF BINGHAMTON, NEW YORK.

FLEXIBLE PHOTOGRAPHIC FILM.

SPECIFICATION forming part of Letters Patent No. 727,283, dated May 5, 1903.

Application filed February 10, 1903. Serial No. 142,752. (No model.)

*To all whom it may concern:*

Be it known that I, PARKER B. CADY, a citizen of the United States, and a resident of Binghamton, in the county of Broome and State of New York, have invented a new and useful Improvement in Flexible Photographic Films of the kind now extensively used and known as "Cartridge-Films," of which the following is a specification, reference being had to the accompanying drawings, in which—

Figure 1 shows a plan view of a strip of film with the usual black paper attached, the central portions of the film being broken away and removed. Fig. 2 shows a plan view of the terminal or ordinarily loose end of the film. Fig. 3 shows a plan view of the terminal or rear end of the black paper. Fig. 4 shows a longitudinal sectional view of the terminals of both the film and the black paper, showing the interlocking of the film in the slots formed in the black paper as contemplated in my invention.

The purpose of this invention is to supply means whereby the ordinarily free or loose end of the film may be detachably attached to the black paper in such manner that the two together may be more perfectly adapted to use in "mechanical developing-boxes," so called, such as the well-known McCurdy developing-box.

The operation of developing a continuous flexible film in developing-boxes such as referred to is very greatly simplified and the operation made more successful if both ends of the film be attached to the black paper, so that both together will travel through the developing-box under control. Various expedients have been resorted to to accomplish this end; but all of them are attended with more or less unsatisfactory results, some, for instance, incident to the operation of the film and black paper during the manipulation in the camera and others incident to the manipulation of the same in the developing-box.

Under my invention I secure the desired attachment of the film to the black paper at both ends and in such manner that a longitudinal movement is possible between them, thus doing away with the objections incident to the former methods of attaching them together, which appear during manipulation of the same in the camera, and likewise providing entirely satisfactory attachment between the two for manipulation in the developing-box and at the same time affording convenient means of detaching the rear or terminal end of the film from the black paper when desired.

Referring to the drawings, A is the black paper.

B is the film.

C is the front end of the black paper. D is its rear or terminal end.

E is the ordinary paster whereby the front end of the film is permanently connected to the black paper.

F F are two slots cut through the black paper near its terminal end, but sufficiently far therefrom to leave the usual length of black paper to act as a light-tight wrapper for the exposed film.

The terminal or normally loose end of the film is cut as shown in Fig. 2—that is to say, recesses G G, which may be in the form of more slits, if preferred, are cut from the edges of the terminal of the film toward its center, leaving a projecting tongue-like part H, which is adapted to engage with the slots F F, made in the black paper. These slots F F extend longitudinally of the black paper for a considerable distance. Their length will depend upon the number of exposures in the film—that is to say, for a twelve-exposure film they may be an inch and a half or more in length and for a six-exposure film a proper proportion thereof—so that as the paper and film are wound upon the spools, during which operation the black paper is inevitably longer than the film, because at each convolution the film takes the inside of the circle and the black paper the outside, there may be sliding or crawling of one relative to the other and yet the attachment of the terminal of the film to the black paper be not separated.

The films being somewhat delicate in structure, I may, if desired, attach a reinforcing tab or piece of fabric or strong paper, as indicated by dotted cross-line I in Fig. 2, to the end of the film, whereby the interlocking tongue H may be strengthened and better adapted to stand such strains as may be brought upon it.

The operation is obvious from an inspection of Fig. 1. The black paper and film, which may be in other respects the same as those now generally used, are united together, as at E, in any preferred manner as now practiced, and at their other or terminal ends the interlocking tongue H will be suitably engaged with the slots F in the black paper, as illustrated. It will be seen that during the winding and unwinding of the film and paper the interlocking part H will be free to move longitudinally through the slots F, thus automatically adjusting themselves to the conditions, and, furthermore, that when the black paper and film are passed through the developing-box the usual fastening E at one end and the interlocking part H on the film, coacting with the slots F in the black paper, will suitably hold the normally free end of the film to the black paper, and if it should be desired to detach the film from the black paper it can be instantly done by slipping the lateral ends of the tongue H out from the slot.

In this invention I have used the words "black paper" merely to indicate a suitable opaque or non-actinic protective layer or covering adequate to shield the sensitive material from the action of light. I call particular attention to the following facts—i. e., this invention is essentially different from a practice now somewhat in vogue of providing upon the normally free end of the film a flap or tab whereby after exposure and before placing the film and black paper in a developing-box the said normally free end may be attached to the black paper, because under my invention the film is at all times, even while upon the stock-spool and during its exposure in the camera, attached to the black paper at both ends. It has no normally free end. This constitutes an important and material difference, because in the use of my film there is no occasion for unrolling the black paper cautiously after exposure until the end of the film or the tab thereon has been reached, that it may then be attached to the black paper. This operation is essential under the practice referred to above, and unless done with the greatest care fogging of the film is almost sure to occur.

My invention is also essentially different from another practice which has obtained heretofore to a certain extent under which both ends of the film have been fixedly attached to the black paper, because although such construction will operate with considerable satisfaction in folding cameras and the like where the spools are separated by a short distance, usually not more than from three to five inches, yet where, as in box-cameras, the spools are located by the sides of the lens at the front of the camera and the stretch of film from spool to spool is considerable—say from twelve to fifteen inches or more—the fixed attachment of the film to the black paper does not work successfully, because of the inevitable "bunching," as it is called, of the black paper, owing to its having greater length than the film in the process of winding from one spool to the other, whereas under my invention, although both ends of the film are attached to the black paper and are controlled by it, yet the attachment at its rear end is, as described, in the form of a slip-joint, whereby bunching of the paper is prevented.

Having described my invention, I claim—

1. A flexible photographic film and a strip of black paper longer than the film, means whereby one end of the film is attached to the black paper and the other end detachably attached thereto.

2. A flexible photographic film and a strip of black paper longer than the film, means whereby one end of the film is attached to the black paper and the other end likewise attached thereto in such manner that it has longitudinal movement relative thereto.

3. A flexible photographic film and a strip of black paper longer than the film and projecting beyond the same at both ends, means whereby one end of the film is permanently attached to the black paper some distance from one end, the other end of the film being provided with a tongue-like extremity adapted to enter slots in the black paper, said slots having sufficient length to permit the necessary longitudinal movement of the film relative to the black paper during manipulation.

4. A flexible photographic film and a strip of black paper longer than the film, means whereby one end of the film is permanently attached to the black paper, means whereby the other end of the film may be made to interlock with the black paper and a reinforcing device to give the requisite strength to the film.

5. A flexible photographic film and a strip of black paper longer than the film, one end of the film being fixedly attached to the black paper and the other non-fixedly attached thereto, the whole being wound upon a spool ready for insertion in a camera and exposure therein.

In testimony whereof I have signed my name to this specification in the presence of two subscribing witnesses.

PARKER B. CADY.

Witnesses:
THERESA M. NILES,
PEHR LUNDGREN.